US012600223B2

(12) United States Patent
Matsuda

(10) Patent No.: US 12,600,223 B2
(45) Date of Patent: Apr. 14, 2026

(54) ENERGY ASSEMBLY

(71) Applicant: KAWASAKI MOTORS, LTD., Akashi (JP)

(72) Inventor: Yoshimoto Matsuda, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 345 days.

(21) Appl. No.: 18/547,406

(22) PCT Filed: Mar. 16, 2021

(86) PCT No.: PCT/JP2021/010579
§ 371 (c)(1),
(2) Date: Aug. 22, 2023

(87) PCT Pub. No.: WO2022/195710
PCT Pub. Date: Sep. 22, 2022

(65) Prior Publication Data
US 2024/0140189 A1 May 2, 2024

(51) Int. Cl.
*B60K 6/46* (2007.10)
*B60K 6/26* (2007.10)
*B60L 50/13* (2019.01)
*B60L 50/61* (2019.01)

(52) U.S. Cl.
CPC ................. *B60K 6/46* (2013.01); *B60K 6/26* (2013.01); *B60L 50/13* (2019.02); *B60L 50/61* (2019.02); *B60L 2210/30* (2013.01); *B60L 2210/40* (2013.01)

(58) Field of Classification Search
CPC .. B60K 6/26; B60K 6/46; B60L 50/13; B60L 50/61; B60L 2210/30; B60L 2210/40
See application file for complete search history.

(56) References Cited

U.S. PATENT DOCUMENTS

| | | | |
|---|---|---|---|
| 7,863,764 B2 * | 1/2011 | Combs | B60L 15/20 |
| | | | 310/179 |
| 8,408,341 B2 * | 4/2013 | Dalum | B60L 1/00 |
| | | | 180/65.285 |
| 9,038,754 B2 | 5/2015 | Takagi | |
| 2009/0230694 A1 | 9/2009 | Yoshida et al. | |

(Continued)

FOREIGN PATENT DOCUMENTS

| | | |
|---|---|---|
| JP | S63189621 A | 8/1988 |
| JP | 2009216014 A | 9/2009 |

(Continued)

*Primary Examiner* — Bryan A Evans
(74) *Attorney, Agent, or Firm* — Alleman Hall LLP

(57) ABSTRACT

An energy assembly includes: an engine including a crank shaft; a starter that starts the engine; an energy converter that is connected to the crank shaft of the engine and converts rotational power of the crank shaft into another type of energy; controlling circuitry configured to control the engine, the starter, and the energy converter; a supporting body supporting the engine, the starter, the energy converter, and the controlling circuitry; and an energy interface that transmits the energy, generated by the energy converter, to an external device detachably attached to the energy assembly. The engine, the starter, the energy converter, the controlling circuitry, and the energy interface are integrated with each other.

17 Claims, 8 Drawing Sheets

(56)     References Cited

U.S. PATENT DOCUMENTS

| 2013/0199463 | A1 | 8/2013 | Pischinger et al. |
| 2017/0256106 | A1 | 9/2017 | Hino |
| 2019/0316588 | A1 | 10/2019 | Makosky et al. |

FOREIGN PATENT DOCUMENTS

| JP | 2010038006 | A | 2/2010 |
| JP | 2013534586 | A | 9/2013 |
| JP | 2014234756 | A | 12/2014 |
| JP | 2016084769 | A | 5/2016 |
| JP | 2017071358 | A | 4/2017 |
| JP | 2018012346 | A | 1/2018 |
| JP | 2019183847 | A | 10/2019 |

* cited by examiner

ENERGY ASSEMBLY

CROSS REFERENCE TO RELATED APPLICATIONS

This application is a national phase application of International Application No. PCT/JP2021/010579, filed on Mar. 16, 2021, entitled ENERGY UNIT, which is incorporated by reference herein in its entirety.

BACKGROUND OF THE INVENTION

Field of the Invention

The present disclosure relates to an energy assembly.

Description of the Related Art

U.S. Pat. No. 9,038,754 discloses a series hybrid vehicle including: a traveling electric motor driven by electric power supplied from a battery; and a power generation engine that drives a power generator to charge the battery.

SUMMARY OF THE INVENTION

According to conventional series hybrid vehicles, a controller, an engine, and the like are individually mounted on the vehicle. Therefore, a configuration for charging the battery and a configuration for driving the traveling electric motor need to be designed separately. In addition, the design of a mounting layout on a vehicle and the decision of an assembling procedure for a vehicle body require time and labor. Moreover, it is desired that when an external device that requires energy is located in a place where energy sources are insufficient, the energy can be easily supplied to the external device.

An object of one aspect of the present disclosure is to provide a configuration that can easily supply energy.

An energy assembly according to one aspect of the present disclosure includes: an engine including a crank shaft; a starter that starts the engine; an energy converter that is connected to the crank shaft of the engine and converts rotational power of the crank shaft into another type of energy; controlling circuitry configured to control the engine, the starter, and the energy converter; and at least one energy interface that transmits the energy, generated by the energy converter, to an external device detachably attached to the energy assembly. The engine, the starter, the energy converter, the controlling circuitry, and the energy interface are integrated with each other.

According to the above configuration, when the energy interface of the energy assembly is connected to an external device that requires energy other than rotational power, and the engine is started by the starter, the energy can be easily supplied to the external device.

DETAILED DESCRIPTION

Hereinafter, an embodiment will be described with reference to the drawings. An energy assembly 1 described below includes a crank shaft 22 extending in a vertical direction (upper-lower direction). In other words, the upper-lower direction of the energy assembly 1 is a direction in which the crank shaft 22 extends, and a direction in a plane which is orthogonal to the crank shaft 22 is a horizontal direction of the energy assembly 1.

Figure 1:
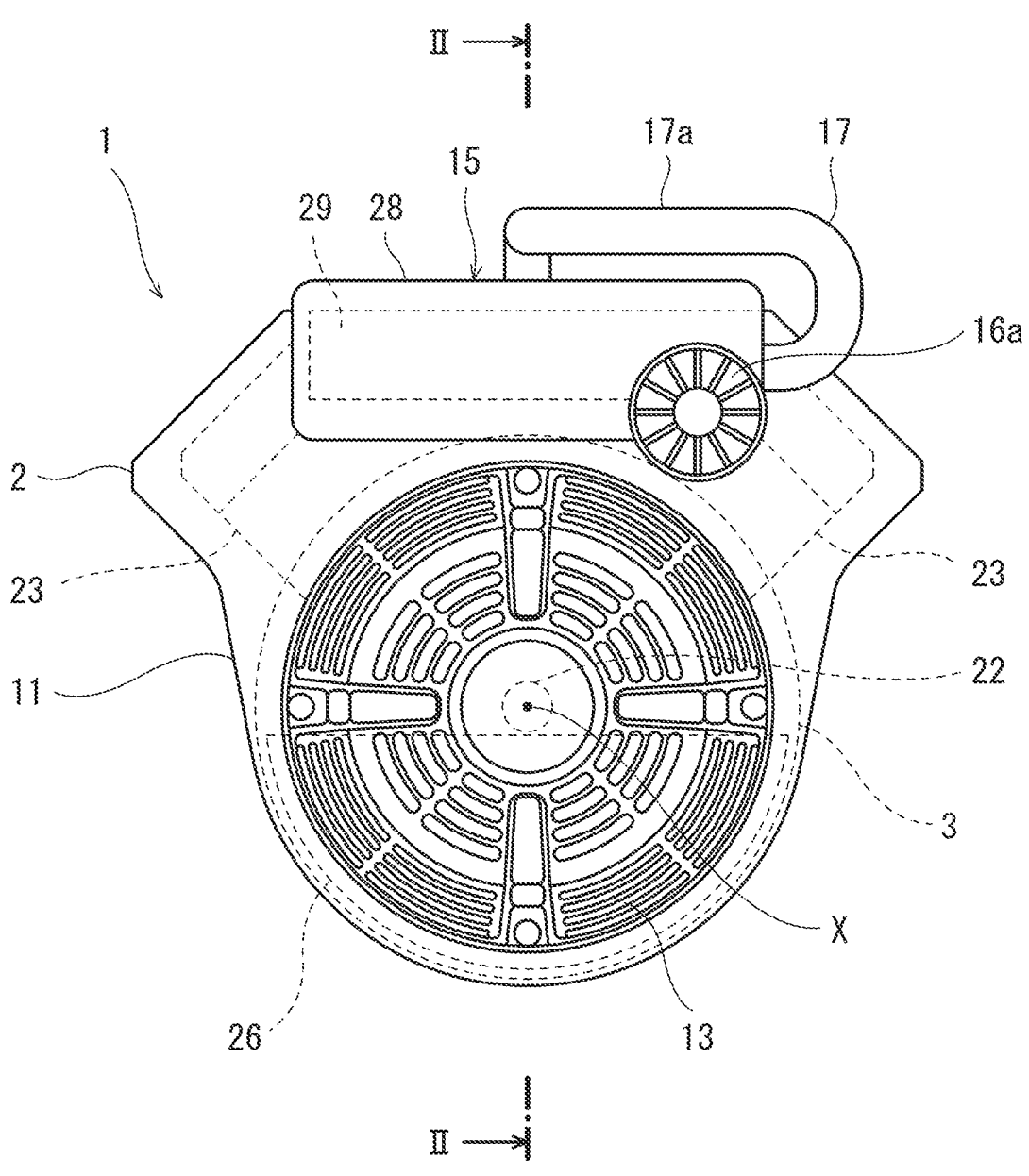
FIG. 1 is a plan view of an energy assembly according to an embodiment.
Figure 2:
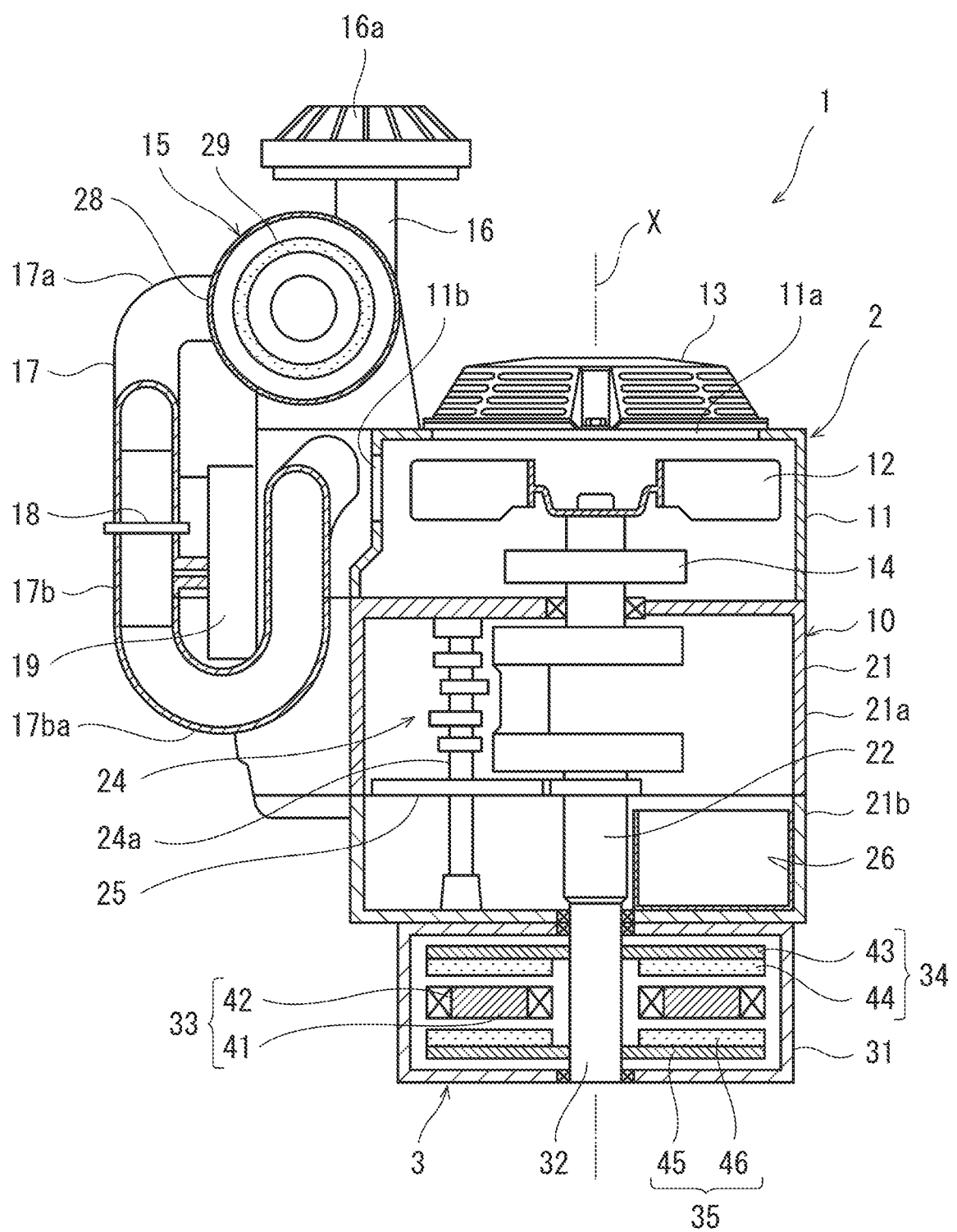
FIG. 2 is a sectional view taken along line II-II of FIG. 1 showing the energy assembly.

FIG. 1 is a plan view of the energy assembly 1 according to the embodiment. FIG. 2 is a sectional view taken along line II-II of FIG. 1 showing the energy assembly 1. As shown in FIGS. 1 and 2, the energy assembly 1 includes an engine unit 2 and an axial gap motor generator 3 driven by the engine unit 2. The engine unit 2 and the axial gap motor generator 3 are integrated with each other. The engine unit 2 includes: an engine 10 that is an internal combustion engine; and an upper cover 11 located at an upper side of the engine 10. Hereinafter, the axial gap motor generator 3 may be simply abbreviated as the motor generator 3.

The engine 10 of the engine unit 2 is a multiple cylinder engine, and for example, is a V-twin engine. The engine 10 includes a crank case 21, the crank shaft 22, a pair of cylinders 23, and a valve gear 24. The crank shaft 22 is accommodated in the crank case 21 while being rotatably supported by the crank case 21. A rotation axis X of the crank shaft 22 extends in the vertical direction. The crank shaft 22 rotates in association with reciprocating movements of pistons in the cylinders 23. The crank shaft 22 rotates a connection target to give kinetic energy to the connection target. Each of the cylinders 23 extends in the horizontal direction when viewed from the crank shaft 22.

The upper cover 11 of the engine unit 2 is fixed to the crank case 21 so as to cover the crank case 21 from above. The upper cover 11 has an inverted U-shaped section that is open downward. The upper cover 11 defines an internal space together with the crank case 21. An upper portion of the crank shaft 22 which projects upward from the crank case 21 is located in the internal space of the upper cover 11. A cooling fan 12 and a sub-power generator 14 are located above the engine 10 and in the internal space of the upper cover 11.

The sub-power generator 14 is attached to the upper portion of the crank shaft 22. To be specific, the sub-power generator 14 generates electric power in such a manner that a rotor (not shown) thereof rotates in association with the crank shaft 22. The electric power generated by the sub-power generator 14 is used as electric power necessary to drive the engine 10. For example, the electric power generated by the sub-power generator 14 is supplied to below-described controlling circuitry 4, and the like. The sub-power generator 14 may serve as a starter that functions as a motor and starts the engine 10.

The cooling fan 12 is attached to the upper portion of the crank shaft 22 so as to be located above the sub-power generator 14. An inflow opening 11a is located at an upper plate portion of the upper cover 11. A fan cover 13 is detachably attached to the upper cover 11 so as to cover the inflow opening 11a. The fan cover 13 has, for example, a net structure that prevents foreign matters from passing therethrough but allows air to pass therethrough.

An outflow opening 11b is located at a side plate portion of the upper cover 11. A louver may be located at the outflow opening 11b. When the cooling fan 12 rotates in association with the crank shaft 22, air is sucked through the fan cover 13 and the inflow opening 11a. The sucked air cools the sub-power generator 14 and the engine 10 and is discharged through the outflow opening 11b to an outside.

The valve gear 24 includes a camshaft 24a extending in the vertical direction and opens and closes intake/exhaust valves (not shown) of the cylinders 23 in mechanical association with the crank shaft 22. The configuration of the valve gear 24 is publicly known and is not especially limited. The rotation of the crank shaft 22 is transmitted to the camshaft 24a through a gear 25. In the horizontal direction, the valve gear 24 is located at one side of the rotation axis X of the crank shaft 22 at which the cylinders 23 exist. To be specific, the valve gear 24 is located in one (the side at which the cylinders 23 exist) of two regions obtained by dividing a space by a virtual vertical plane which includes the rotation axis X of the crank shaft 22 and is perpendicular to a virtual line connecting the rotation axis X and the center of gravity of the pair of cylinders 23.

The engine unit 2 includes an air cleaner 15 that purifies intake air to be supplied to the engine 10. An upper end of the air cleaner 15 is located higher than an upper end of the engine 10. Specifically, the upper end of the air cleaner 15 is located higher than an upper surface of the upper cover 11. The air cleaner 15 includes an air cleaner case 28 and a cleaner element 29 (filter) accommodated in the air cleaner case 28.

Specifically, the air cleaner case 28 includes a tubular peripheral wall portion and end wall portions which close both ends of the peripheral wall portion. The air cleaner case 28 is located such that an axis thereof is directed in the horizontal direction. The cleaner element 29 has a cylindrical shape. A radially inner side of the cleaner element 29 is a clean side, and a radially outer side of the cleaner element 29 is a dirty side.

A duct 16 projects upward from the peripheral wall portion of the air cleaner case 28. The duct 16 communicates with the dirty side of the air cleaner 15. A suction opening 16a is located at an upper end of the duct 16. To be specific, the suction opening 16a is located higher than the air cleaner case 28 and the cleaner element 29. A filter may be located at the suction opening 16a. Outside air sucked through the suction opening 16a is guided to the dirty side located at a radially outer side of the cleaner element 29, flows through the cleaner element 29 to be purified, and is guided to the clean side located at a radially inner side of the cleaner element 29.

An intake air pipe 17 that communicates with the clean side located at the radially inner side of the cleaner element 29 is connected to the end wall portion of the air cleaner case 28. The intake air pipe 17 includes a first portion 17a and a second portion 17b. The first portion 17a extends in the horizontal direction. The second portion 17b has a U shape that extends downward, makes a U-turn, and extends upward. Therefore, the length of an intake air passage of the intake air pipe 17 is made long in a small space. A downstream end of the second portion 17b of the intake air pipe 17 is located such that the intake air can be supplied to combustion chambers of the cylinders 23. The second portion 17b may have an inverted U shape that extends upward, makes a U-turn, and extends downward.

A throttle device 18 including a throttle valve is located at the intake air pipe 17. A fuel supplier 19 is located at the intake air pipe 17. The fuel supplier 19 is, for example, an injector or a carburetor. Specifically, the throttle device 18 and the fuel supplier 19 are located at the second portion 17b of the intake air pipe 17 and upstream of a U-turn portion 17ba. Therefore, the intake air passage extending from the throttle device 18 and the fuel supplier 19 to the cylinders 23 is made long.

An oil pan 26 that is open upward is located at a lower portion of the crank case 21. Specifically, the oil pan 26 is located at a lower portion of the internal space of the crank case 21. The oil pan 26 is located at such a height as to overlap the crank shaft 22 in a direction (vertical direction) along the rotation axis X of the crank shaft 22. In the horizontal direction, the oil pan 26 is located at a side of the rotation axis X of the crank shaft 22 which is opposite to the side at which the valve gear 24 exists.

To be specific, the oil pan 26 is located in the other (the side at which the cylinders 23 do not exist) of the two regions obtained by dividing the space by the virtual vertical plane which includes the rotation axis X of the crank shaft 22 and is perpendicular to the virtual line connecting the rotation axis X and the center of gravity of the pair of cylinders 23. The oil pan 26 may be expanded so as to reach a vertically lower side of the valve gear 24. Moreover, a lower case 21b may also serve as the oil pan.

The motor generator 3 is located at a lower side of the engine 10. The motor generator 3 may be located at an upper side of the engine 10. The motor generator 3 is located under the oil pan 26. The motor generator 3 is attached to a lower surface of the engine 10. The motor generator 3 is located lower than the entire engine unit 2.

As described below, the axial gap motor generator 3 includes a substantially plate-shaped stator 33 and substantially plate-shaped rotors 34 and 35. The stator 33 and the rotors 34 and 35 are lined up in an axial direction of a rotating shaft 32 such that main surfaces of the stator 33 and the rotors 34 and 35 are opposed to each other. To be specific, in the axial gap motor generator 3, a main direction of magnetic flux of the rotors 34 and 36 is the axial direction of the rotating shaft 32. Therefore, the dimension of the axial gap motor generator 3 in the axial direction of the rotating shaft 32 can be reduced.

The motor generator 3, the cooling fan 12, and the sub-power generator 14 are located coaxially with the crank shaft 22. The motor generator 3 is larger than the sub-power generator 14. Specifically, the volume of the motor generator 3 is larger than the volume of the sub-power generator 14. In a top view of the energy assembly 1, an area occupied by the motor generator 3 is larger than an area occupied by the sub-power generator 14. A rated output (power generation capability per unit time) of the motor generator 3 is larger than a rated output (power generation capability per unit time) of the sub-power generator 14.

The dimension of the motor generator 3 in the vertical direction is larger than the dimension of the sub-power generator 14 in the vertical direction. The dimension of the motor generator 3 in the vertical direction is smaller than the dimension of the motor generator 3 in the horizontal direction. The dimension of the motor generator 3 in the vertical direction is smaller than the dimension of the engine 10 in the vertical direction. When viewed from a direction in which the rotation axis X extends, the motor generator 3 is located inside an outer shape of the engine 10 (see FIG. 1). When viewed from the direction in which the rotation axis X extends, the motor generator 3 may protrude outward from the outer shape of the engine 10.

The motor generator 3 includes a case 31, the rotating shaft 32, the stator 33, the first rotor 34, and the second rotor 35. The rotating shaft 32 extending in the vertical direction is supported by the case 31 so as to be rotatable. In a plan view, the case 31 has a circular outer shape. The rotating shaft 32 is located at a lower side of the crank shaft 22. A rotation axis of the rotating shaft 32 coincides with the rotation axis X of the crank shaft 22. The rotating shaft 32 is coupled to the crank shaft 22 so as to rotate integrally with the crank shaft 22.

The first rotor 34, the stator 33, and the second rotor 35 are line up in this order from an upper side to a lower side. The stator 33 includes a stator core 41 and a coil 42 located at the stator core 41. The coil 42 is connected to a terminal of the motor generator 3. The stator 33 is rotatable relative to the rotating shaft 32 and is supported in a stationary state relative to the case 31.

The first rotor 34 includes a first rotor core 43 and a first magnet 44. The first rotor core 43 has a circular plate shape and is externally fitted to the rotating shaft 32 so as to rotate integrally with the rotating shaft 32. The first magnet 44 is located at the first rotor core 43 so as to be opposed to an upper surface of the stator 33. The second rotor 35 includes a second rotor core 45 and a second magnet 46. The second rotor core 45 has a circular plate shape and is externally fitted to the rotating shaft 32 so as to rotate integrally with the rotating shaft 32. The second magnet 46 is located at the second rotor core 45 so as to be opposed to a lower surface of the stator 33.

There is a gap between the first rotor 34 and the stator 33 in a direction along the rotation axis. Moreover, there is a gap between the second rotor 35 and the stator 33 in the direction along the rotation axis. The first rotor 34 and the second rotor 35 are connected to the crank shaft 22 through the rotating shaft 32 so as to rotate about the rotation axis X in association with the crank shaft 22. The configuration of the motor generator 3 is not especially limited. For example, one rotor and a pair of stators may be included, or rotors and stators may be included. Or, one rotor and one stator may be included. Moreover, the motor generator 3 may be of a radial gap type instead of the axial gap type.

In the motor generator 3, the first rotor 34 and the second rotor 35 are rotated by the crank shaft 22, and this generates a current at the coil 42 (power generation function). In the motor generator 3, the first rotor 34 and the second rotor 35 are rotated by a magnetic field generated by supplying a current to the coil 42, and this generates rotational power that rotates the crank shaft 22 (motor function). The motor generator 3 is an integrated starter generator (ISG) that has both of a power generation function of generating electric power by the rotational power of the crank shaft 22 of the engine 10 and a starter motor function of starting the engine 10. To be specific, the motor generator 3 may serve as a starter that can start the engine 10.

Figure 3:
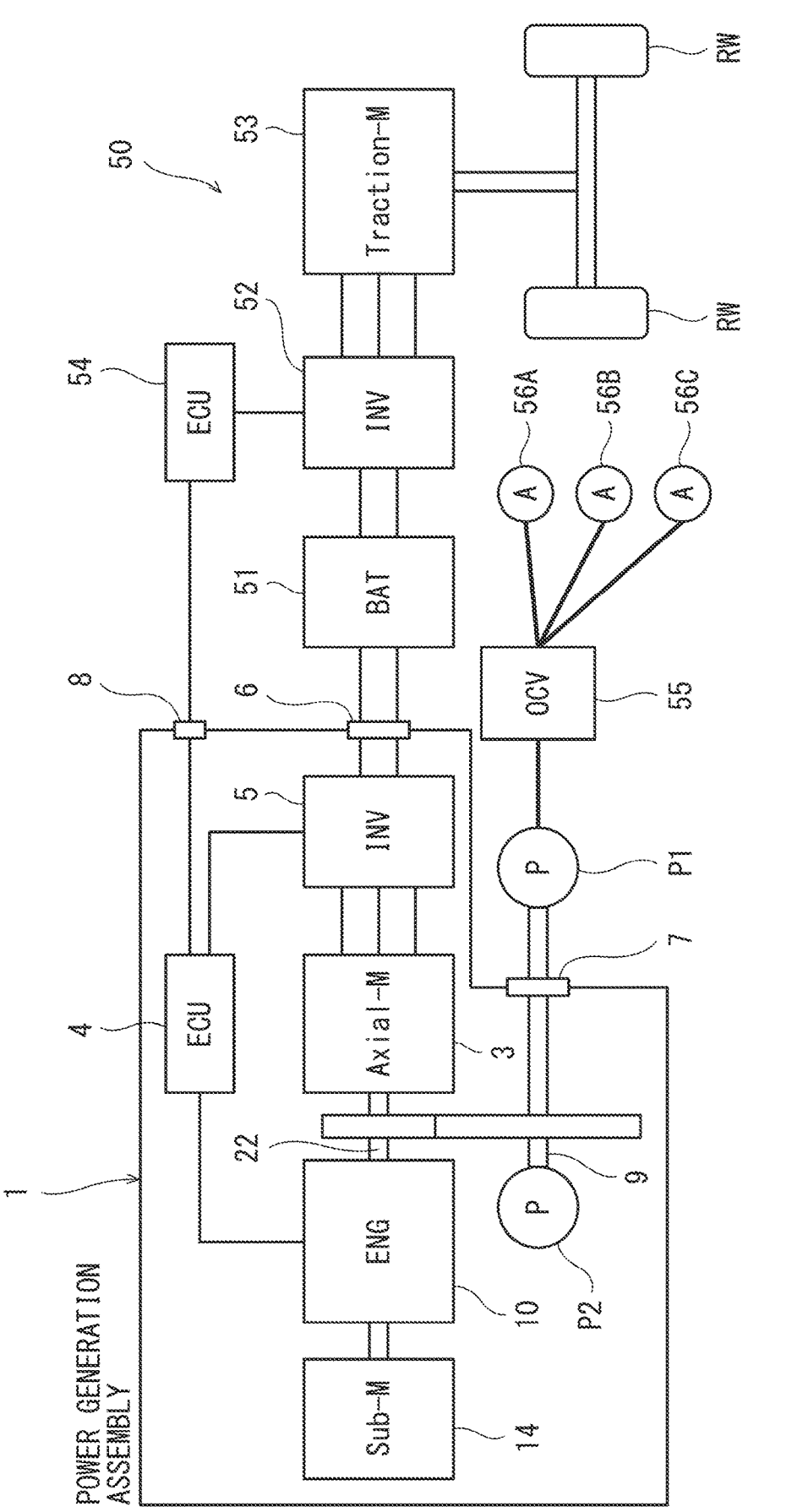
FIG. 3 is a block diagram of an operating apparatus on which the energy assembly of FIG. 2 is detachably mounted.

FIG. 3 is a block diagram of an operating apparatus 50 on which the energy assembly 1 of FIG. 2 is detachably mounted. As shown in FIG. 3, the energy assembly 1 includes an inverter 5 (conversion circuit structure; regulator) electrically connected to the motor generator 3. The inverter 5 is integrally connected to the motor generator 3. The inverter 5 includes an AC-DC conversion circuit that convers AC power, generated by the motor generator 3, into DC power, adjusts the voltage of the DC power, and charges a battery 51. In addition, the inverter 5 includes a DC-AC conversion circuit that converts the DC power, discharged from the below-described battery 51, into the AC power, adjusts the voltage of the AC power, and supplies the AC power to the motor generator 3. The motor generator 3 and the inverter 5 serve as an energy converter that can convert the rotational power of the crank shaft 22 into another type of energy (electric energy).

The energy assembly 1 includes the controlling circuitry 4 that is an electronic control unit. The controlling circuitry 4 controls the engine 10 and the inverter 5. The controlling circuitry 4 controls the engine 10 such that the output of the engine 10 is constant. The energy assembly 1 also includes a regulator (not shown) that converts the AC power, generated by the sub-power generator 14, into the DC power and adjusts the voltage of the DC power.

In the energy assembly 1, the engine 10, the motor generator 3, the controlling circuitry 4, the inverter 5, the sub-power generator 14, a cooling medium pump P2, and the like are fixed to each other and integrated with each other. The engine 10, the motor generator 3, the controlling circuitry 4, the inverter 5, the sub-power generator 14, the cooling medium pump P2, and the like may be supported by a supporting body (for example, a frame) and unitized.

The operating apparatus 50 includes the battery 51, an inverter 52, a traction motor 53, an operation circuitry 54, and the like. The operating apparatus 50 is a series hybrid vehicle. The operating apparatus 50 is one example of an external device on which the energy assembly 1 is detachably mounted. The traction motor 53 generates traveling power and drives driving wheels (for example, rear wheels RW). The inverter 52 converts the DC power, discharged from the battery 51, into the AC power, adjusts the voltage of the AC power, and supplies the AC power to the traction motor 53. In addition, the inverter 52 converts the AC power, regenerated by the traction motor 53, into the DC power, adjusts the voltage of the DC power, and charges the battery 51. The operation circuitry 54 controls the inverter 52. The operation circuitry 54 can control traveling torque of the operating apparatus 50.

The battery 51 is electrically connected to an electric interface 6 of the energy assembly 1 and is electrically connected to the traction motor 53 of the operating apparatus 50 through the inverter 52. To be specific, the battery 51 can relay the electric power from the electric interface 6 of the energy assembly 1 to the traction motor 53 and can relay the electric power, regenerated by the traction motor 53, to the electric interface 6 of the energy assembly 1. To be specific, the battery 51 serves as an energy relay.

The energy assembly 1 includes the electric interface 6 as one of energy interfaces. The electric interface 6 electrically connects the inverter 5 of the energy assembly 1 to the battery 51 located outside the energy assembly 1. In the case of contact power supply, the electric interface 6 is a detachable terminal or a detachable electric power connector. In the case of non-contact power supply, the electric interface 6 is a coil.

The energy assembly 1 includes a communication interface 8. The communication interface 8 communicably connects the controlling circuitry 4 of the energy assembly 1 to the operation circuitry 54 located outside the energy assembly 1. In the case of wired communication, the communication interface 8 is a detachable terminal or a detachable communication connector. In the case of wireless communication, the communication interface 8 is a known wireless communicator.

The operating apparatus 50 includes an oil pump P1, an oil control valve unit 55, and hydraulic actuators 56A to 56C. The oil pump P1 discharges oil when rotational driving power is input to a driven shaft of the oil pump P1. The hydraulic actuators 56A to 56C are, for example, hydraulic cylinders that generate braking power. The oil control valve unit 55 serves as a fluid regulator that opens and closes a passage between the oil pump P1 and each of the hydraulic actuators 56A to 56C to control hydraulic pressure to be applied to the hydraulic actuators 56A to 56C. The operation of the oil control valve unit 55 is controlled by the operation circuitry 54.

The oil control valve unit 55 is fluidically connected to the oil pump P1 and is fluidically connected to the hydraulic actuators 56A to 56C of the operating apparatus 50. To be specific, the oil control valve unit 55 can relay the hydraulic pressure from the oil pump P1 to the hydraulic actuators 56A to 56C. To be specific, the oil control valve unit 55 serves as the energy relay.

The energy assembly 1 includes a mechanical interface 7. The mechanical interface 7 can output the rotational power of the crank shaft 22 as mechanical energy. The mechanical interface 7 is, for example, a PTO shaft including an engaging portion (such as a spline groove or a keyway) that can be engaged with a mating member so as not to be rotatable relative to the mating member. A power transmitting path 9 (such as a gear mechanism, a chain-sprocket mechanism, or a belt-pulley mechanism) that transmits the rotational power of the crank shaft 22 to the mechanical interface 7 is located between the crank shaft 22 and the mechanical interface 7. The motor generator 3 is mechanically connected to the power transmitting path 9.

The rotational power generated by the motor generator 3 can be output from the mechanical interface 7 through the power transmitting path 9. The mechanical interface 7 is detachably connected to the driven shaft of the oil pump P1. To be specific, the oil pump P1 is driven by the rotational power supplied from the mechanical interface 7. Moreover, a driven shaft of the cooling medium pump P2 is mechanically connected to the power transmitting path 9.

The rotational power generated by the engine 10 and the rotational power generated by the motor generator 3 can be superimposed on each other at the power transmitting path 9. When a predetermined condition is satisfied (for example, when there is a request from the operation circuitry 54), the controlling circuitry 4 drives the engine 10 and also drives the motor generator 3 as a motor. Therefore, the rotational power generated by both of the engine 10 and the motor generator 3 is output from the mechanical interface 7 through the power transmitting path 9. At this time, while controlling the engine 10 such that the output of the engine 10 is constant, the controlling circuitry 4 controls the inverter 5 so as to change the driving torque of the motor generator 3. Thus, the controlling circuitry 4 can adjust the output from the mechanical interface 7.

The electric interface 6, the mechanical interface 7, and the communication interface 8 are detachable from the operating apparatus 50. Therefore, the energy assembly 1 is easily attachable to and detachable from the operating apparatus 50.

Figure 4:
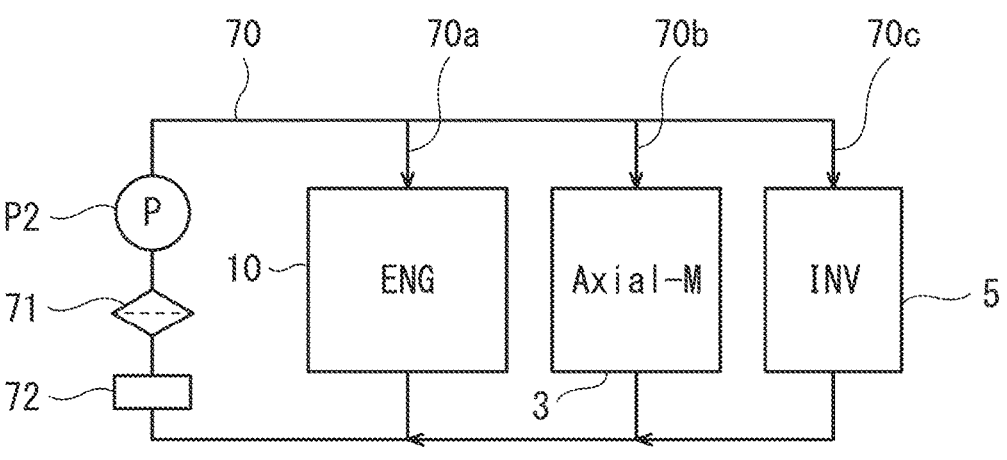
FIG. 4 is a block diagram of a cooling structure of the energy assembly of FIG. 2.

FIG. 4 is a block diagram of a modified example of a cooling structure of the energy assembly 1 of FIG. 2. As shown in FIG. 4, the energy assembly 1 includes a cooling passage 70. The cooling passage 70 includes an EG cooling passage 70a that cools the engine 10. The EG cooling passage 70a is a circulation passage through which a cooling medium (for example, water) discharged from the cooling medium pump P2 is guided to the engine 10, and the cooling medium having cooled the engine 10 is returned to the cooling medium pump P2. A filter 71 and a radiator 72 are located at the EG cooling passage 70a.

The cooling passage 70 includes an MG cooling passage 70b that cools the motor generator 3. The MG cooling passage 70b branches from the EG cooling passage 70a, guides the cooling medium (for example, water) to the motor generator 3, and returns the cooling medium, having cooled the motor generator 3, to the EG cooling passage 70a. The cooling passage 70 includes an IV cooling passage 70c that cools the inverter 5. The IV cooling passage 70c branches from the EG cooling passage 70a or the MG cooling passage 70b, guides the cooling medium (for example, water) to the inverter 5, and returns the cooling medium, having cooled the inverter 5, to the EG cooling passage 70a or the MG cooling passage 70b. The cooling passage 70 may not include the IV cooling passage 70c and may not include the EG cooling passage 70a.

Figure 5:
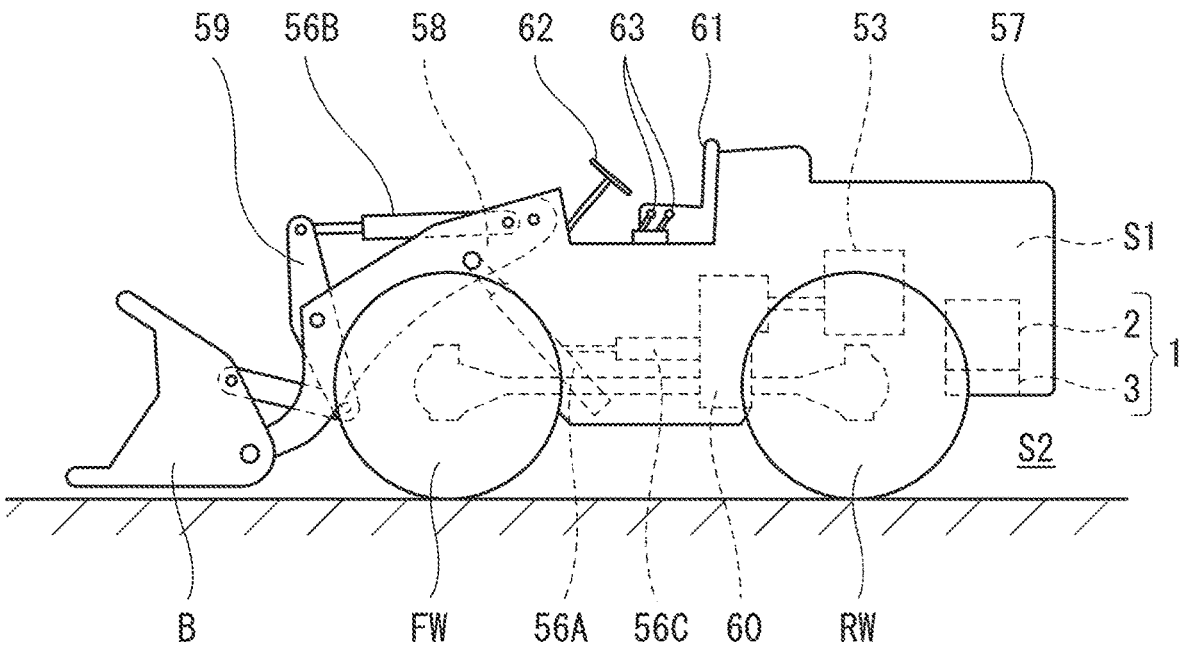
FIG. 5 is a side view of the operating apparatus of FIG. 3.

FIG. 5 is a side view of the operating apparatus 50 of FIG. 3. As shown in FIG. 5, as one example, the operating apparatus 50 is a working vehicle, such as a wheel loader. The operating apparatus includes front wheels FW, rear wheels RW, and a vehicle body 57 supported by the front wheels FW and the rear wheels RW. A base end portion of an arm 58 is turnably connected to a front portion of the vehicle body 57. One end of the hydraulic actuator 56A that lifts and lowers the arm 58 is connected to the vehicle body 57, and the other end of the hydraulic actuator 56A is connected to a portion of the arm 58 which is close to the base end portion of the arm 58. A bucket B is turnably connected to a tip portion of the arm 58. One end of the hydraulic actuator 56B that turns the bucket B is connected to the vehicle body 57, and the other end of the hydraulic actuator 56B is connected to the bucket B through a lever 59.

The traction motor 53 that generates the driving power is mounted on the vehicle body 57. The traction motor 53 is connected to the front wheels FW and the rear wheels RW through a power distributer 60 so as to be able to transmit power to the front wheels FW and the rear wheels RW. The hydraulic actuator 56C that steers the front wheels FW of the operating apparatus 50 is located at the vehicle body 57. A driver's seat 61 is located at the vehicle body 57. A handle 62 that is operated by a driver for the steering, an operating lever 63 that is used to operate the arm 58 and the bucket B, and the like are located in the vicinity of the driver's seat 61.

A vehicle internal space S1 is formed in the vehicle body 57 so as to be located behind the driver's seat 61. At least part of the energy assembly 1 is located in the vehicle internal space S1. The energy assembly 1 is supported by the vehicle body 57 in such a posture that the motor generator 3 is located under the engine unit 2. The energy assembly 1 is located in a space sandwiched between the left rear wheel RW and the right rear wheel RW. In a side view, at least part of the energy assembly 1 overlaps the rear wheel RW. The energy assembly 1 is mounted on the vehicle body 57 such that a lower end of the motor generator 3 is located lower than upper ends of the rear wheels RW (when the operating apparatus 50 is in a stop state and an empty state). At least part of the energy assembly 1 may be located in front of the driver's seat 61.

Figure 6:
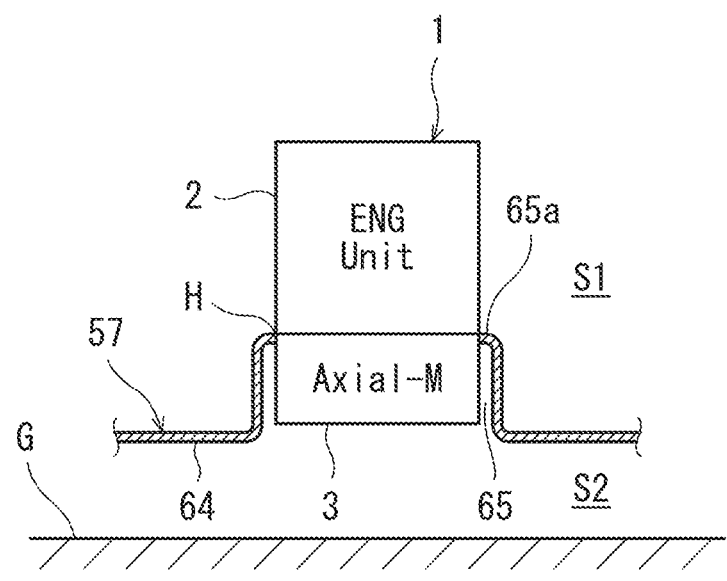
FIG. 6 is a schematic sectional view showing the energy assembly of the operating apparatus of FIG. 5 and its vicinity which are viewed from front.

FIG. 6 is a schematic sectional view showing the energy assembly 1 of the operating apparatus 50 of FIG. 5 and its vicinity which are viewed from behind. As shown in FIG. 6, the motor generator 3 is located at a lower side of a bottom plate 64 of the vehicle body 57. At least part of the motor generator 3 is exposed to a vehicle external space S2 located outside the bottom plate 64. The motor generator 3 may be located in both of the vehicle internal space S1 and the vehicle external space S2, or the entire motor generator 3 may be located in the vehicle external space S2.

The bottom plate 64 includes a recess 65 that is recessed upward. An upper plate portion 65a of the recess 65 includes an opening H. The energy assembly 1 extends through the opening H. The engine unit 2 is accommodated in the vehicle internal space S1. The motor generator 3 is accommodated in the recess 65. The lower end of the motor generator 3 is located at a height equal to or higher than a lower surface of a portion of the bottom plate 64 which is adjacent to the recess 65.

The bottom plate 64 may not include the recess 65 that accommodates the motor generator 3. To be specific, the motor generator 3 may be located so as to project downward from the bottom plate 64. The entire energy assembly 1 may be located in the vehicle internal space S1. Air (traveling wind) in the vehicle external space S2 during traveling may be guided to the motor generator 3. Moreover, the air (traveling wind) in the vehicle external space S2 during traveling may also be guided to the engine unit 2.

The working vehicle was described as one example of the operating apparatus 50 on which the energy assembly 1 is detachably mounted. However, the energy assembly 1 may be applied to apparatuses other than the working vehicle as long as the apparatuses operate by using energy supplied from the energy assembly 1. For example, the operating apparatus may be a vehicle (for example, a two-wheeled vehicle, a three-wheeled vehicle, or an automobile) different from the working vehicle, or may be a robot. The robot may include a moving structure (for example, a wheel, a leg, or a propeller) which operates by receiving energy, to change the position of the robot. In addition to the moving structure, the robot may include a structure (for example, an arm and/or a hand which are driven by an actuator) that performs some kind of operation (work). The robot is a robot including a main body on which an operator does not get. The robot operates by remote manipulation through wireless communication or wired communication or autonomously operate in accordance with a predetermined program.

According to the above-described configuration, when the electric interface 6 of the energy assembly 1 is connected to the operating apparatus 50 that requires the electric energy, and the engine 10 is started by the motor generator 3, the electric energy can be easily supplied to the operating apparatus 50. Therefore, an assembly that can easily supply electric energy can be provided.

In addition, the motor generator 3 that generates electric power by the power of the engine 10 can also serve as a starter that starts the engine 10. Therefore, an assembly that can easily supply electric power, is compact, and is of a cassette type can be provided.

Moreover, since the axial gap motor generator 3 is used as the motor generator, the size of the energy assembly 1 in the axial direction X of crank shaft 22 can be reduced. Thus, the energy assembly 1 can be reduced in size.

Moreover, since the energy assembly 1 can output plural types of energy which are different from each other, connectable external devices can be increased, and versatility can be improved.

Moreover, since the energy assembly 1 outputs the mechanical energy in addition to the electric energy that is high in versatility, high output energy is easily supplied to external devices, and the external devices can easily perform high-load work.

Moreover, when a predetermined condition is satisfied, the controlling circuitry 4 controls the inverter 5 such that the output of the mechanical energy (rotational power) from the mechanical interface 7 is adjusted by the torque of the motor generator 3. Therefore, the output of the mechanical energy can be assisted so as to be adjusted by the torque (positive torque or negative torque) of the motor generator 3 while suppressing a change in a driving state of the engine 10.

The predetermined condition includes a condition that the controlling circuitry 4 has received a request signal from the operation circuitry 54 of the operating apparatus 50 through the communication interface 8. Therefore, the output of the mechanical energy from the mechanical interface 7 can be adjusted in accordance with a request of the operation circuitry 54 of the operating apparatus 50. For example, even when the load of each of the hydraulic actuators 56A to 56C of the operating apparatus 50 increases and exceeds an allowable value, the mechanical energy is generated by not only the driving power of the engine 10 but also the driving power of the motor generator 3, and therefore, the hydraulic actuators 56A to 56C can be appropriately operated.

Moreover, since the controlling circuitry 4 controls the engine 10 such that the output of the engine 10 is constant, control of changing the output of the engine is unnecessary, and therefore, complex control can be omitted. Furthermore, the engine 10 can be made to operate with constant fuel efficiency in a highly efficient rotational frequency zone, and therefore, the energy assembly 1 with high fuel efficiency can be designed.

Moreover, by attaching the energy assembly 1 to the operating apparatus 50 including the battery 51, the inverter 52, the traction motor 53, and the like, the operating apparatus 50 can be easily operated. Furthermore, by preparing the energy assemblies 1, the operation of the operating apparatus 50 can be continued only by replacing the energy assembly 1 when the remaining fuel of the energy assembly 1 is used up, for example. Thus, the refueling operation can be replaced with the replacing operation of the energy assembly 1.

Figure 7:
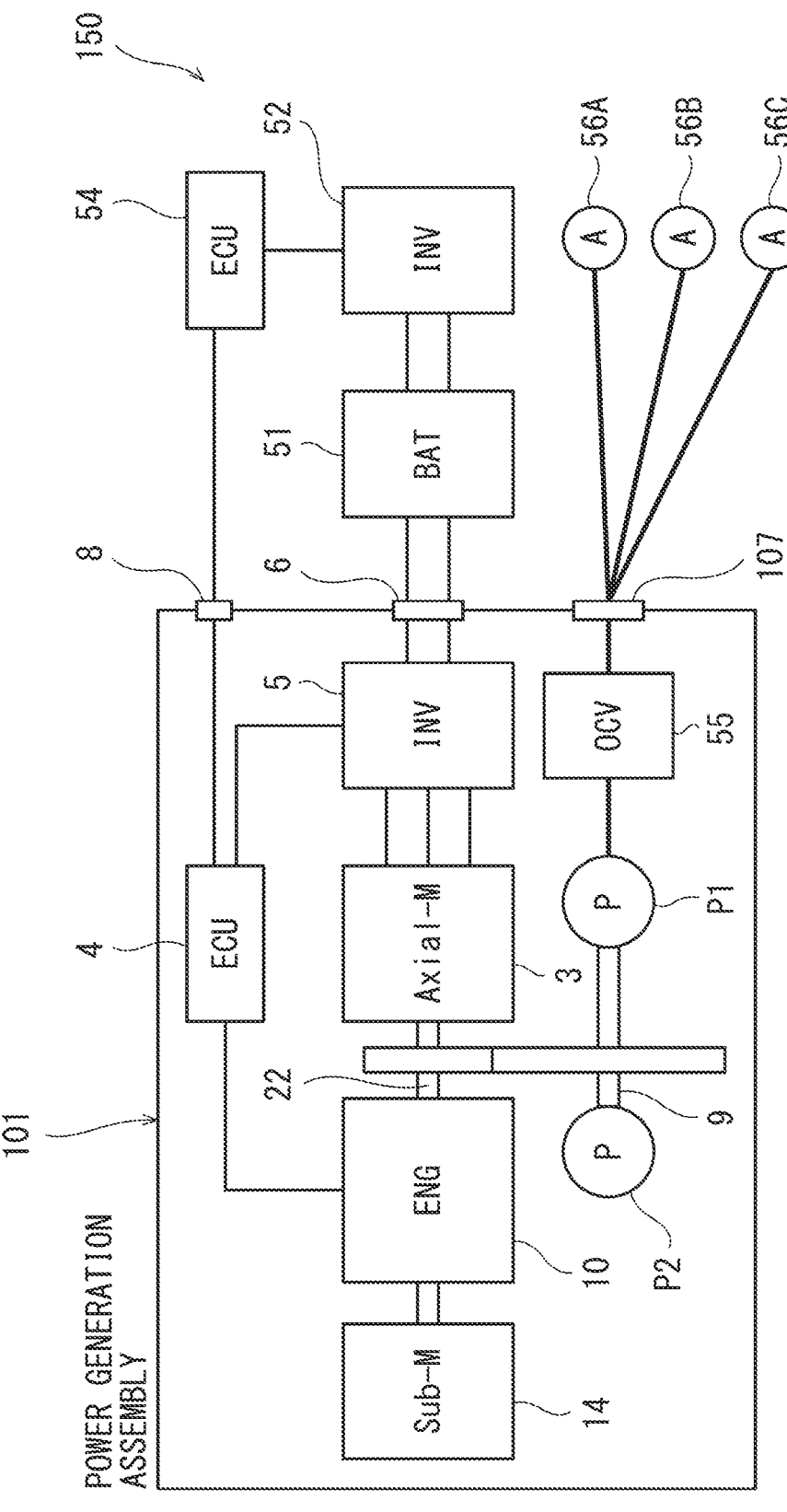
FIG. 7 is a block diagram of First Modified Example of the energy assembly of FIG. 3.

FIG. 7 is a block diagram of an energy assembly 101 of First Modified Example. As shown in FIG. 7, the oil pump P1 and the oil control valve unit 55 are included in the energy assembly 101 of First Modified Example. The oil pump P1 serves as an energy converter that can convert the rotational power, transmitted from the crank shaft 22 through a power transmitting structure 9, into another type of energy (fluid energy). Instead of the mechanical interface 7, the energy assembly 101 includes a fluid interface 107 as one of the energy interfaces. The fluid interface 107 outputs the oil, discharged from the oil pump P1, to an outside.

Specifically, a pipe connected to an inflow port of the oil control valve unit 55 of the vehicle 150 is detachably connected to the fluid interface 107. The oil discharged by the oil pump P1 is output through the fluid interface 107 to the oil control valve unit 55 located outside the energy assembly 101. To be specific, the hydraulic pressure from the fluid interface 107 is supplied to the hydraulic actuators 56A to 56C through the oil control valve unit 55.

According to this configuration, the oil pump P1 and the oil control valve unit 55 are included in the energy assembly 101. Therefore, the configuration of the vehicle 150 except for the energy assembly 1 can be simplified. The oil control valve unit 55 that can control the hydraulic pressure is included in the energy assembly 1. Therefore, only by inputting a hydraulic pressure request value to the controlling circuitry 4 from an outside of the energy assembly 1, the controlling circuitry 4 can control the oil control valve unit 55 to output desired hydraulic pressure from the fluid interface 55.

Moreover, since the energy assembly 1 outputs the fluid energy in addition to the electric energy that is high in versatility, high output energy is easily supplied to external devices, and the external devices can easily perform high-load work. Moreover, when the fluid interface 107 of the energy assembly 1 is connected to the external hydraulic actuators 56A to 56C that require hydraulic pressure, the hydraulic pressure can be supplied to the hydraulic actuators 56A to 56C. Therefore, the energy assembly 1 that can easily supply the fluid energy and is of a cassette type can be provided. Since the other components are the same as those of the above embodiment, the same reference signs are used, and explanations thereof are omitted.

Figure 8:
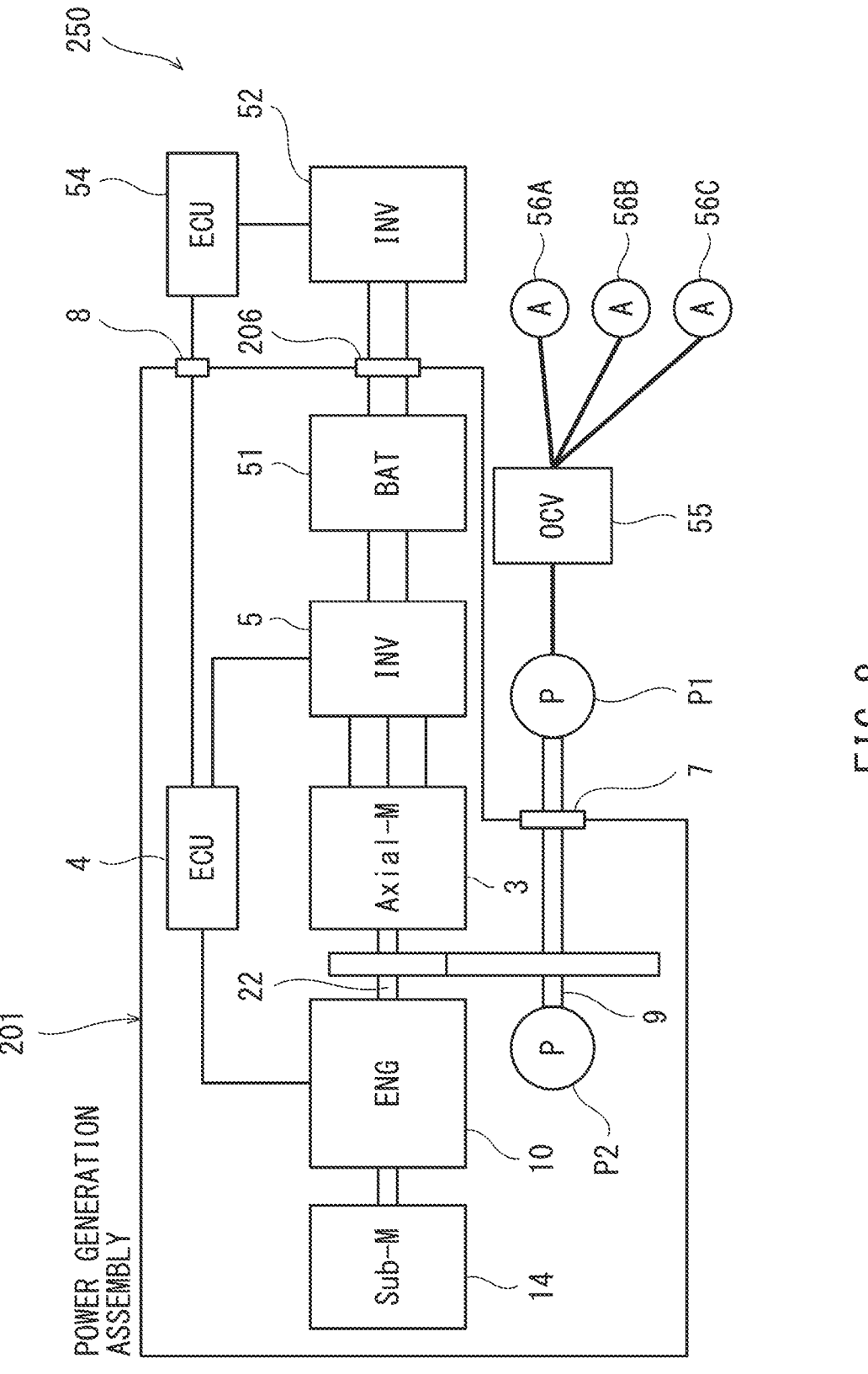
FIG. 8 is a block diagram of Second Modified Example of the energy assembly of FIG. 3.

FIG. 8 is a block diagram of an energy assembly 201 of Second Modified Example. As shown in FIG. 8, the battery 51 is included in the energy assembly 201 of Second Modified Example. An electric interface 206 of the energy assembly 201 outputs the DC power, discharged from the battery 51, to an outside. Specifically, an electric wire connected to the inverter 52 of a vehicle 250 is detachably connected to the electric interface 206 through a terminal or a connector. Non-contact power supply may be performed between the electric interface 206 and the inverter 52. In this case, the electric interface 206 may be a coil.

The electric power discharged from the battery 51 is supplied through the electric interface 206 to the inverter 52 located outside the energy assembly 201. Moreover, the inverter 52 charges the battery 51 through the electric interface 206 by the electric power regenerated by the traction motor 53 (FIG. 3). The controlling circuitry 4 controls charging and discharging of the battery 51 in accordance with a signal received from the operation circuitry 54 through the communication interface 8. According to this configuration, since the battery 51 is included in the energy assembly 201, the configuration of the vehicle 250 except for the energy assembly 201 can be simplified. Since the other components are the same as those in the above embodiment or the above modified example, the same reference signs are used, and explanations thereof are omitted.

Figure 9:
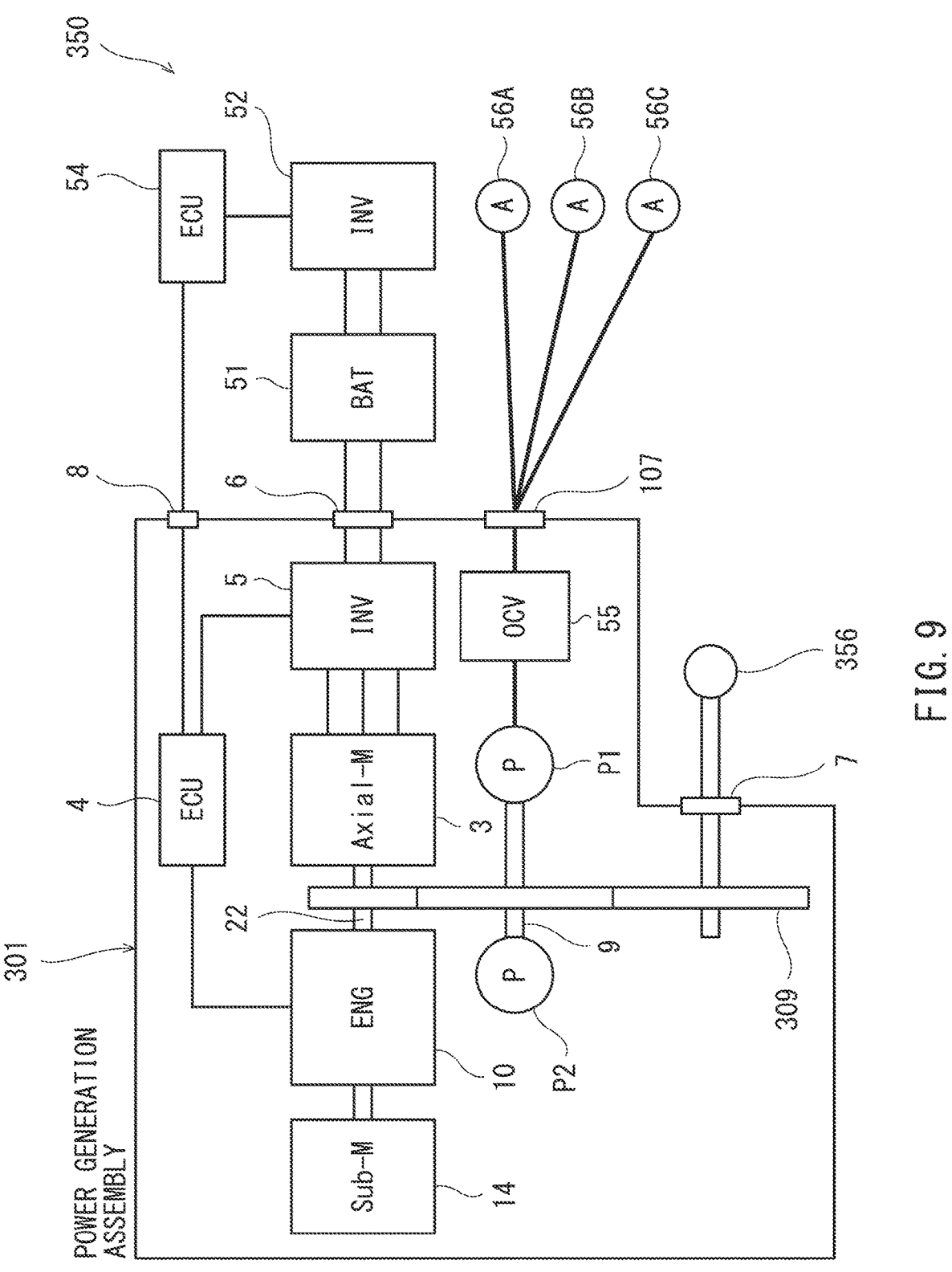
FIG. 9 is a block diagram of Third Modified Example of the energy assembly of FIG. 3.

FIG. 9 is a block diagram of an energy assembly 301 of Third Modified Example. As shown in FIG. 9, the energy assembly 301 of Third Modified Example includes both of the fluid interface 107 and the mechanical interface 7 in addition to the electric interface 5 and the communication interface 8. The rotational power from the engine 10 and/or the motor generator 3 can be output from the mechanical interface 7 through the power transmitting structures 9 and 309. An operating apparatus 356 (for example, a wheel, a pump, a propeller, a fan, a rotary cutter, and the like) of the vehicle 250 is detachably connected to the mechanical interface 7.

To be specific, when the rotational power output from the mechanical interface 7 of the energy assembly 301 is input to the operating apparatus 356, the operating apparatus 356 operates. According to this configuration, three types of energy which are the electric energy, the fluid energy, and the mechanical energy can be easily supplied to the operating apparatus 350 (external device) by the energy assembly 301. Since the other components are the same as those in the above embodiment or the above modified example, the same reference signs are used, and explanations thereof are omitted.

The present disclosure is not limited to the above embodiment and the modified examples. Modifications, additions, and eliminations may be made with respect to the configurations of the embodiment and the modified examples. For example, some of components or methods in one embodiment or one modified example may be applied to another embodiment or another modified example. Some components in an embodiment or a modified example may be separated and arbitrarily extracted from the other components in the embodiment or the modified example. Moreover, the energy assembly may be independently used without being mounted on the operating apparatus. For example, the energy assembly may be a power generation assembly which includes an electric interface and is of a stationary type or a portable type.

What is claimed is:

1. An energy assembly comprising:

an engine including a crank shaft;

a starter that starts the engine;

an energy converter that is connected to the crank shaft of the engine and converts rotational power of the crank shaft into another type of energy;

controlling circuitry configured to control the engine, the starter, and the energy converter;

at least one energy interface that outputs electric energy and non-electric energy different from the electric energy and transmits the energy, generated by the energy converter, to an external device detachably attached to the energy assembly; and a communication interface that is connected to the controlling circuitry and is communicable with the external device connected to the at least one energy interface, wherein:

the engine, the starter, the energy converter, the controlling circuitry, and the at least one energy interface are integrated with each other;

when a predetermined condition is satisfied, the controlling circuitry controls the energy converter to adjust output of the non-electric energy; and the predetermined condition includes a condition that the controlling circuitry has received a request signal from the external device through the communication interface.

2. The energy assembly according to claim 1, wherein:

the energy converter includes a motor generator connected to the crank shaft of the engine and at least one conversion circuit structure including an AC-DC conversion circuit and a DC-AC conversion circuit, the AC-DC conversion circuit converting AC power, generated by the motor generator, into DC power and outputting the DC power, the DC-AC conversion circuit converting the input DC power into the AC power and supplying the AC power to the motor generator;

the motor generator which serves as a motor and the at least one conversion circuit structure which serves as a device that converts the DC power into the AC power serve as the starter; and the at least one energy interface includes an electric interface that transmits the electric energy output from the at least one conversion circuit structure.

3. The energy assembly according to claim 2, wherein:
the motor generator is an axial gap motor generator; and
the axial gap motor generator includes
    a rotor connected to the crank shaft so as to be rotatable
      about a rotation axis extending in an axial direction
      of the crank shaft and
    a stator opposed to the rotor in the axial direction while
      being spaced apart from the rotor in the axial direc-
      tion.

4. The energy assembly according to claim 1, wherein the
at least one energy interface to which the external device is
connected outputs plural types of energy which are different
from each other.

5. The energy assembly according to claim 4, wherein the
non-electric energy includes fluid energy or mechanical
energy.

6. The energy assembly according to claim 1, wherein:
the energy converter includes a fluid pump that converts
    the rotational power of the crank shaft into fluid energy;
    and
the at least one energy interface includes a fluid interface
    fluidically connected to the fluid pump.

7. The energy assembly according to claim 6, further
comprising a fluid regulator that is located between the fluid
pump and the fluid interface and controls a fluid pressure
between the fluid pump and the fluid interface, wherein
    the controlling circuitry controls the fluid regulator.

8. The energy assembly according to claim 1, further
comprising a fluid regulator, wherein:
the energy converter includes
    a motor generator connected to the crank shaft of the
      engine and
    a fluid pump that converts the rotational power of the
      crank shaft and rotational power of the motor gen-
      erator into fluid energy;
the at least one energy interface includes a fluid interface
    that is fluidically connected to the fluid pump;
the fluid regulator is located between the fluid pump and
    the fluid interface and controls a fluid pressure between
    the fluid pump and the fluid interface; and
the controlling circuitry controls the motor generator to
    adjust the fluid energy output from the fluid interface
    and controls the fluid regulator to adjust the fluid
    energy output from the fluid interface.

9. The energy assembly according to claim 1, wherein:
the engine, the starter, the energy converter, the control-
    ling circuitry, and the at least one energy interface are
    integrated with each other as an assembly that is
    attachable to and detachable from the external device;
the energy converter includes
    a motor generator that converts the rotational power of
      the crank shaft into the electric energy and
    a power transmitting structure or a fluid pump to which
      the rotational power of the crank shaft is transmitted;
the power transmitting structure converts the rotational
    power of the crank shaft into mechanical energy;
the fluid pump converts the rotational power of the crank
    shaft into fluid energy; and
the at least one energy interface includes
    a first interface that detachably and electrically con-
      nects the motor generator to the external device and
    a second interface that detachably connects the power
      transmitting structure or the fluid pump to the exter-
      nal device mechanically or fluidically.

10. The energy assembly according to claim 1, wherein
the controlling circuitry controls the engine such that output
of the engine is constant.

11. An energy assembly comprising:
an engine;
an energy converter that converts rotational power of a
    crank shaft of the engine into electric energy and
    includes a motor generator and a conversion circuit
    structure, the motor generator being connected to the
    crank shaft of the engine, the conversion circuit struc-
    ture controlling input and output of electric power to
    and from the motor generator;
controlling circuitry configured to control the engine and
    the motor generator;
a first interface that outputs the electric energy generated
    by the energy converter;
a second interface that outputs non-electric energy gen-
    erated by the engine; and
a communication interface that is connected to the con-
    trolling circuitry and is communicable with an external
    device detachably connected to the first interface or the
    second interface, wherein:
when a predetermined condition is satisfied, the control-
    ling circuitry controls the conversion circuit structure to
    adjust output of the non-electric energy, output from the
    second interface, by torque of the motor generator; and
the predetermined condition includes a condition that the
    controlling circuitry has received a request signal from
    the external device through the communication inter-
    face.

12. An operating apparatus comprising:
an energy assembly;
at least one energy relay;
at least one actuator connected to the at least one energy
    relay so as to transmit energy to the at least one energy
    relay; and
operation circuitry that controls the at least one actuator,
    wherein:
the energy assembly includes
    an engine including a crank shaft,
    a starter that starts the engine,
    at least one energy converter that is connected to the
      crank shaft of the engine and converts rotational
      power of the crank shaft into another type of energy,
    controlling circuitry configured to control the engine,
      the starter, and the at least one energy converter,
    a supporting body that supports the engine, the starter,
      the at least one energy converter, and the controlling
      circuitry, and
    at least one energy interface that transmits the energy
      generated by the at least one energy converter;
the at least one energy relay is connected to the at least
    one energy interface of the energy assembly;
the at least one energy converter includes a motor gen-
    erator that converts the rotational power of the crank
    shaft into electric energy;
the at least one energy interface includes an electric
    interface;
the at least one actuator includes an electric actuator; and
the at least one energy relay includes a battery electrically
    connected to the electric interface and the electric
    actuator.

13. The operating apparatus according to claim 12,
wherein:
the at least one energy converter includes a fluid pump
    that converts the rotational power of the crank shaft and
    rotational power of the motor generator into fluid
    energy;
the at least one energy interface includes a fluid interface
    that is fluidically connected to the fluid pump;

the at least one actuator includes a fluid actuator;

the at least one energy relay includes a fluid regulator that is fluidically connected to the fluid actuator and the fluid interface and controls a fluid pressure between the fluid actuator and the fluid interface; and the controlling circuitry controls the motor generator to adjust the fluid energy output from the fluid interface and controls the fluid regulator to adjust the fluid energy output from the fluid interface.

14. The energy assembly according to claim 12, wherein:

the energy assembly further includes a communication interface that is communicably connected to the controlling circuitry and is communicable with the at least one energy interface; and the controlling circuitry controls charging and discharging of the battery in accordance with a signal received from the operation circuitry through the communication interface.

15. The operating apparatus according to claim 12, wherein:

the at least one energy converter includes a fluid pump that converts the rotational power of the crank shaft into fluid energy;

the at least one energy interface includes a fluid interface;

the at least one actuator includes a fluid actuator; and the at least one energy relay includes a fluid regulator that is fluidically connected to the fluid actuator and the fluid interface and controls a fluid pressure between the fluid actuator and the fluid interface.

16. The energy assembly according to claim 15, wherein:

the energy assembly further includes a communication interface that is communicably connected to the controlling circuitry and is communicable with the at least one energy interface; and the controlling circuitry controls the fluid regulator in accordance with a signal received from the operation circuitry through the communication interface.

17. The operating apparatus according to claim 12, wherein:

the engine, the starter, the at least one energy converter, the controlling circuitry, and the at least one energy interface are integrated with each other as an assembly that is attachable to and detachable from an external device;

the at least one energy converter includes a power transmitting structure or a fluid pump to which the rotational power of the crank shaft is transmitted;

the power transmitting structure converts the rotational power of the crank shaft into mechanical energy;

the fluid pump converts the rotational power of the crank shaft into fluid energy; and the at least one energy interface includes a first interface that is the electric interface that detachably and electrically connects the motor generator to the at least one energy relay and a second interface that detachably connects the power transmitting structure or the fluid pump to the at least one energy relay mechanically or fluidically.

* * * * *